(12) United States Patent
Miyata et al.

(10) Patent No.: US 9,630,540 B2
(45) Date of Patent: Apr. 25, 2017

(54) HEADREST

(71) Applicant: TACHI-S CO., LTD., Akishima-shi (JP)

(72) Inventors: Kei Miyata, Akishima (JP); Junpei Yoshikawa, Akishima (JP)

(73) Assignee: TACHI-S CO., LTD., Akishima-shi (JP)

( * ) Notice: Subject to any disclaimer, the term of this patent is extended or adjusted under 35 U.S.C. 154(b) by 165 days.

(21) Appl. No.: 14/652,560

(22) PCT Filed: Dec. 18, 2013

(86) PCT No.: PCT/JP2013/083917
§ 371 (c)(1),
(2) Date: Jun. 16, 2015

(87) PCT Pub. No.: WO2014/103836
PCT Pub. Date: Jul. 3, 2014

(65) Prior Publication Data
US 2015/0314714 A1    Nov. 5, 2015

(30) Foreign Application Priority Data
Dec. 28, 2012    (JP) ................. 2012-286641

(51) Int. Cl.
*B60N 2/70* (2006.01)
*B60N 2/58* (2006.01)
*B60N 2/48* (2006.01)

(52) U.S. Cl.
CPC ............ *B60N 2/7017* (2013.01); *B60N 2/48* (2013.01); *B60N 2/58* (2013.01); *B60N 2/5875* (2013.01); *B60N 2/5883* (2013.01); *B60N 2/5891* (2013.01)

(58) Field of Classification Search
USPC .................................... 297/391–410
See application file for complete search history.

(56) References Cited

U.S. PATENT DOCUMENTS 5,858,044 A * 1/1999 Nepsund ............ B01D 46/0024
55/486
6,077,378 A * 6/2000 Bullard ................ A47C 27/127
156/252

(Continued)

FOREIGN PATENT DOCUMENTS

JP    05056829    *   3/1993
JP    06002240    *   1/1994

(Continued)

OTHER PUBLICATIONS

Japanese Office Action issued Jun. 28, 2016 in Patent Application No. 2012-286641 (with English language translation).

(Continued)

*Primary Examiner* — David E Allred
(74) *Attorney, Agent, or Firm* — Oblon, McClelland, Maier & Neustadt, L.L.P.

(57) ABSTRACT

A headrest including: a trim cover element formed in a three-dimensional bag-like configuration, a fiber assembly; and a foam padding. The fiber assembly and foam padding are both provided within the trim cover element in such a manner that the fiber assembly is secured to and positioned on a front surface side of the trim cover element, whereas the foam padding is positioned on a rear surface side of the fiber assembly. The foam padding has been created by a foaming process so as to be integral with the trim cover element and fiber assembly.

6 Claims, 5 Drawing Sheets

(56) References Cited

U.S. PATENT DOCUMENTS

| | | | |
|---|---|---|---|
| 2003/0098113 A1 | 5/2003 | Takei | |
| 2005/0249931 A1* | 11/2005 | Utsumi | B32B 5/26 428/218 |
| 2007/0209115 A1* | 9/2007 | Carroll | A47C 7/383 5/636 |
| 2011/0187173 A1 | 8/2011 | Janz et al. | |

FOREIGN PATENT DOCUMENTS

| | | | |
|---|---|---|---|
| JP | H0649013 | * | 6/1994 |
| JP | 7 313287 | | 12/1995 |
| JP | 2002020979 | * | 1/2002 |
| JP | 2002 120237 | | 4/2002 |
| JP | 2002 240058 | | 8/2002 |
| JP | 2002-347043 A | | 12/2002 |
| JP | 2006 69286 | | 3/2006 |
| JP | 4490213 | | 6/2010 |
| JP | 2011-529353 A | | 12/2011 |
| WO | WO 2010/012469 A2 | | 2/2010 |

OTHER PUBLICATIONS

Combined Chinese Office Action and Search Report issued May 26, 2016 in Patent Application No. 201380066780.3 (with partial English translation and English translation of categories of cited documents).

International Search Report Issued May 20, 2014 in PCT/JP2013/083917 Filed Dec. 18, 2013.

Extended European Search Report issued Jul. 14, 2016 in Patent Application No. 13867558.2.

* cited by examiner

HEADREST

TECHNICAL FIELD

The present invention relates to a headrest for use with an automotive seat.

BACKGROUND ART

Japanese Patent No. 4490213 discloses a conventional technology in this headrest field. A headrest described in this prior art includes a foam padding and a stay supported on a seat, the stay being at its upper portion embedded in the foam padding. This stay is formed by: a pair of leg portions which are exposed from the foam padding and extend in a predetermined spaced-apart and parallel relation with each other; and an inverted-U-shaped load receiving portion defined between those two leg portions at an upper region of the stay. The foam padding consists of one foam padding element having a normal-repulsive elasticity and another foam padding element having a low-repulsive elasticity. A process for forming this kind of headrest entails: providing a three-dimensional trim cover element; attaching a low-repulsive foam padding element to a forwardly-facing inner surface of that three-dimensional trim cover element; inserting the aforesaid stay in the trim cover assembly; placing the thus-prepared trim cover element in a foaming die; injecting a liquid foaming agent, such as a liquid urethan foaming agent, in the trim cover element; and curing the liquid foaming agent to create an increased mass of a foam padding element having a normal-repulsive elasticity. As a result thereof, a headrest is formed, which has the normal-repulsive foam padding element and the low-repulsive foam padding element, in a manner integral with the trim cover assembly. The provision of such low-repulsive foam padding element in the forwardly-facing side of the headrest is effective for preventing a deep sinking or recession of the corresponding padding region of the headrest which is caused by contact of a passenger's head therewith and also effective for suppressing a subsequent great rebound of the passenger's head from that particular padding region of the headrest.

PRIOR-ART LITERATURE

Patent-Related Document

Patent-related Document 1: Japanese Patent No. 4490213

SUMMARY OF THE INVENTION

Problems to be Solved by the Present Invention

However, the foam padding element having a low-repulsive elasticity used in the above-stated conventional headrest is so great in density as to increase the weight of that particular foam padding. This raises the problem that the increased weight of the foam padding element requires a labor and hard handling on the side of a worker involved in assembling the headrest.

Further, another problem of this prior art is that such high-density foam padding element does exist as a hard layer limiting a distance or space between the trim cover assembly and the stay, which means that, in such limited space, the liquid foaming agent is cured and expanded to become the aforesaid normal-repulsive foam padding during a foaming process. Consequently, adjustment for positioning the stay within the resulting foam padding is also limited due to the presence of the low-repulsive foam padding element, and therefore a freedom for positioning the stay within the headrest is limited.

It is a purpose of the present invention to provide a headrest which materializes its light weight, while insuring that a safety and a comfortable touch is provided to an area of the headrest on which a head of a passenger is to be contacted.

Means for Solving the Problem

The present invention is characterized by comprising: a trim cover element formed in a three-dimensional bag-like configuration; a fiber assembly provided within the trim cover element, the fiber assembly being secured to and positioned on a front side of the trim cover element; and a foam padding provided within the trim cover element, the foam padding being positioned on a rear side of the fiber assembly and being created by a foaming process so as to be integral with the trim cover element and fiber assembly.

According to this headrest, it is possible to adjust a thickness of the fiber assembly to a desired degree in the forward and rearward directions of the headrest, and therefore, the fiber assembly having a desired thickness can be secured to and positioned on the front side of the trim cover element. With this arrangement, it is possible to reduce a ratio of a heavy-weight foam padding to be used in the headrest, thereby realizing a light weight of the headrest, while insuring that a safety and a comfortable touch is given to an area of the hardest on which a passenger's head is to be contacted. Further, a thickness of the fiber assembly can be adjusted to a desired degree, thereby permitting the stay to be located at a desired location, so that a freedom for positioning the stay in the headrest is increased.

Preferably, a sewing region may be defined in and along a peripheral end portion of the fiber assembly, and such sewing region be integrally sewn with the trim cover element.

For example, the fibers of the fiber assembly may each be made of a thermally-fusible synthetic resin material, wherein such thermally-fusible synthetic resin material should be used as a primary ingredient in forming the fiber. In such mode, a whole peripheral end portion of the fiber assembly can be simply heated and pressed into the aforesaid sewing region which is amenable to sewing. Such sewing region of the fiber assembly be sewn with the trim cover element, so that the fiber assembly itself is positively retained in the trim cover element, and further, even when a liquid foaming agent is injected in the trim cover element during a foaming process, the fiber assembly is positively prevented from being dislocated from its predetermined position, so that both fiber assembly and foam padding are precisely formed together in a required integral fashion.

It is also preferable that the trim cover element with the fiber assembly secured thereto as stated above may be subjected to a foaming process wherein a liquid foaming agent for creation of a foam padding is injected and cured in that trim cover element, with a view to forming a foam padding in a manner integral with both of the fiber assembly and trim cover element.

A resulting foam padding formed in that manner is indeed integral with the fiber assembly within the trim cover element.

Effects of the Invention

The present invention therefore provides a headrest that realizes its light weight, while insuring that a safety and a comfortable touch is provided to an area of the headrest on which a head of a passenger is to be contacted.

MODE FOR CARRYING OUT THE INVENTION

Hereinafter, with reference to the annexed drawings, a detailed description will be made of preferred embodiments of a headrest in accordance with the present invention.

Figure 1:
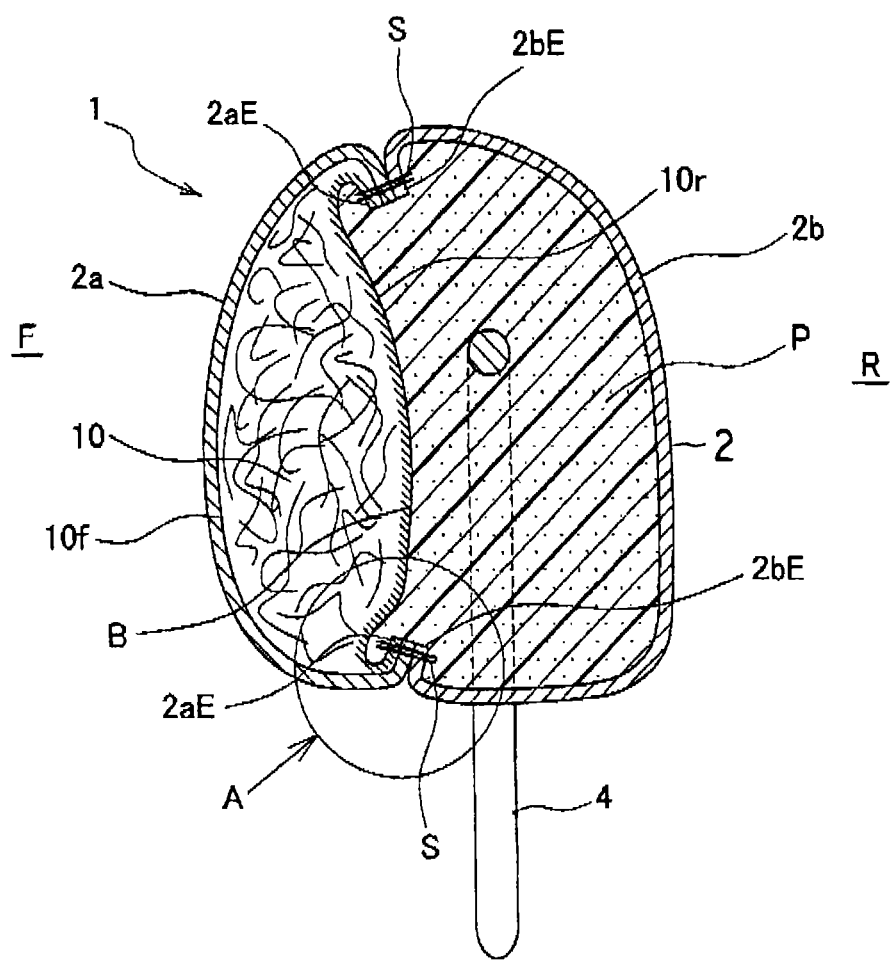
FIG. 1: A sectional view showing one exemplary embodiment of headrest in accordance with the present invention.

As shown in FIG. 1, a headrest 1 is comprised of: a three-dimensional trim cover element 2 formed in a three-dimensional bag-like shape by means of sewing; a foam padding P provided in the trim cover element 2, wherein the foam padding has been formed by injecting and curing a liquid foaming agent (e.g. liquid urethane foaming agent) in the trim cover element; and a stay 4 fixed to a headrest frame provided in the foam padding P. Therefore, the headrest 1 is what can be described as a foam product integral with a trim cover element.

The trim cover element 2 includes: a front surface region 2a facing a side (a forward side F) where a passenger's head is to be received; and a rear surface region 2b facing a rearward side R. As will be described later, a peripheral end portion 2aE of the front surface region 2a and a peripheral end portion 2bE of the rear surface region 2b are sewn with a peripheral end portion 10a of a fiber assembly 10 so as to maintain the three-dimensional shape of the trim cover assembly.

Figure 2:
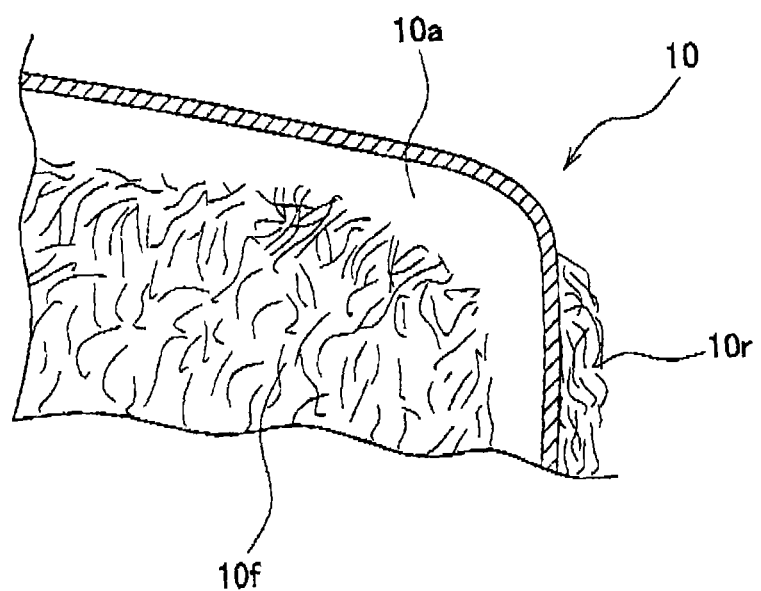
FIG. 2: A diagram intended for depicting front and rear surface regions of a fiber assembly shown in the FIG. 1.

The fiber assembly 10, which has an elastic property, is formed by an air-blowing packing method wherein fibers are blown with an air into a die and then packed and shaped within that die, thereby forming a lump of entangled fibers which is provided as the fiber assembly. The fibers used may include: polyolefin fibers, polyester fibers, or polyethylene fibers, for instance. In other words, each of the fibers of the fiber assembly 10 may be made of a thermally-fusible synthetic resin material, wherein such thermally-fusible synthetic resin material should be used as a primary ingredient in forming the fiber. Hence, a whole peripheral end portion of the fiber assembly 10 can be simply heated and pressed into a flattened sewing region 10a amenable to sewing, as indicated in FIG. 2. Designation 10f denotes a front surface region of the fiber assembly 10, and designation 10r denotes a rear surface region of that fiber assembly.

Figure 3:
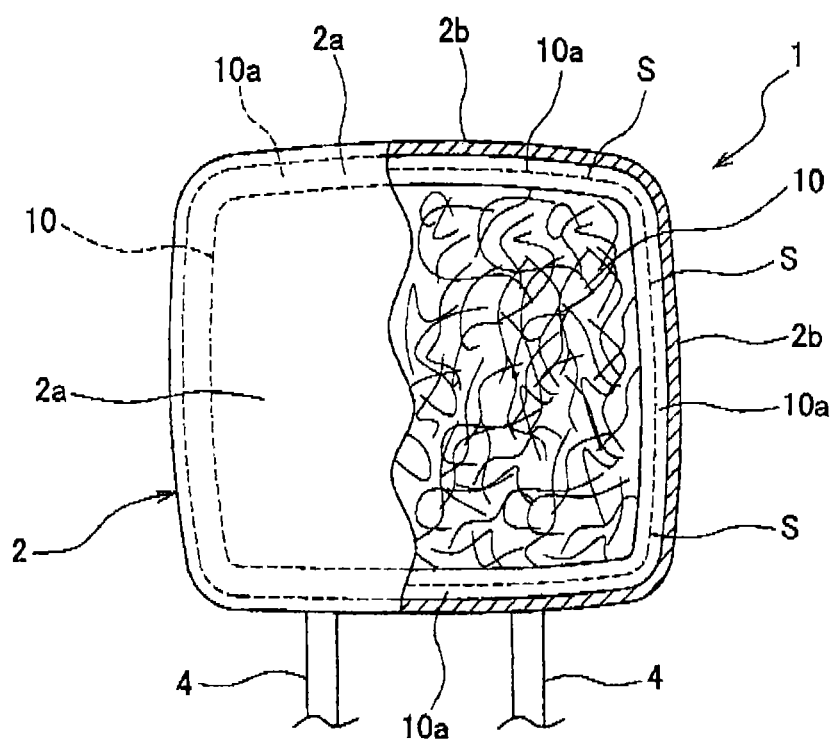
FIG. 3: A partly-broken front view of the headrest shown in the FIG. 1.
Figure 4:
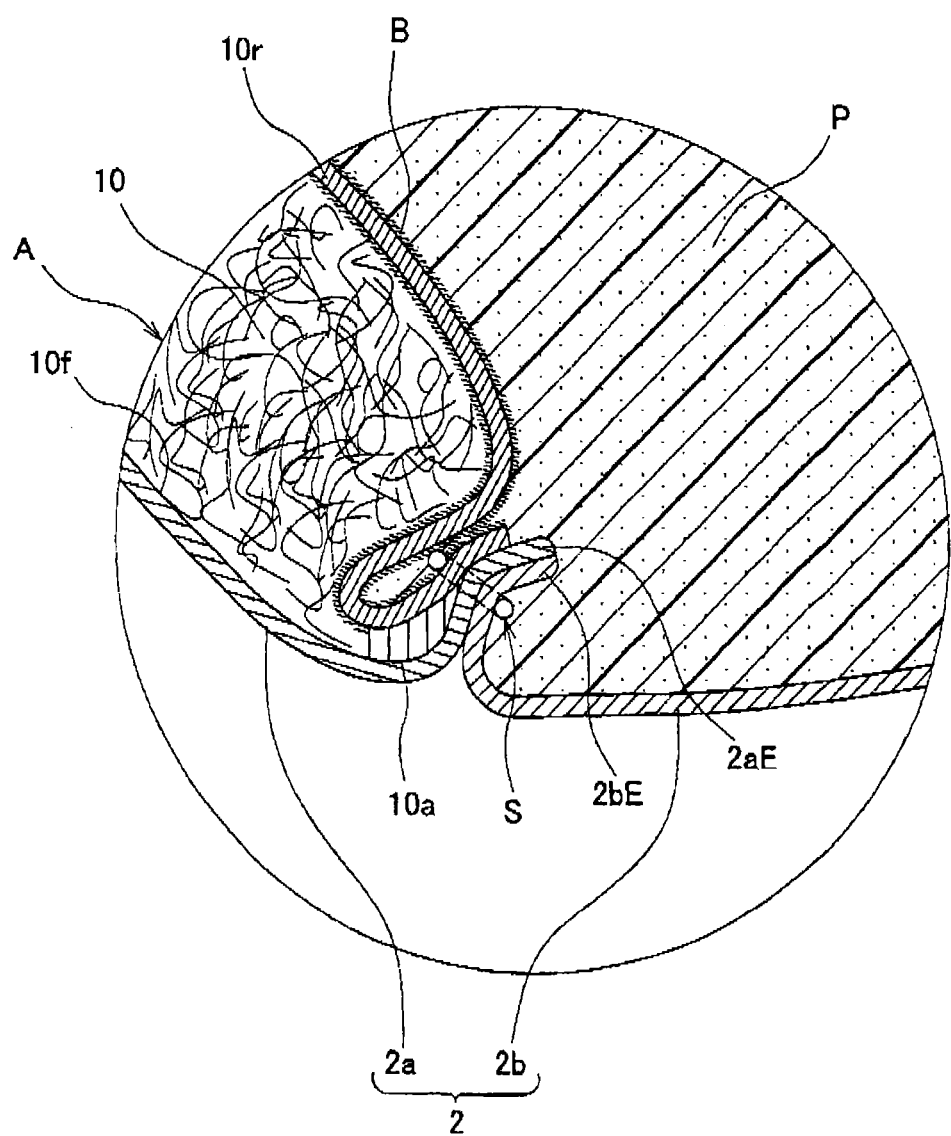
FIG. 4: An enlarged sectional view showing a principal part of the headrest which is encircled and designated by A in the FIG. 1.

Prior to a foaming process to be stated below, from FIGS. 3 and 4, it is observed that the fiber assembly 10 is disposed at a reverse surface of the front surface region 2a of the trim cover element 2, and that the peripheral end portion 10a of the fiber assembly 10 is integrally sewn with the peripheral end portion 2aE of the aforesaid front surface region 2a along a sewing line (sewing threads) designated by S, whereas the peripheral end portion 2bE of the aforesaid rear surface region 2b is also integrally sewn with the peripheral end portion of the fiber assembly along the sewing line S (see FIG. 4).

Accordingly, the trim cover element 2 is formed in the three-dimensional bag-like shape, such that the fiber assembly 10 is fixedly provided therewithin by sewing as stated above. Then, although not shown, such trim cover element 2 with the fiber assembly 10 sewn to the inside thereof is placed in a foaming die. Thereafter, a liquid foaming agent, a base material for forming foam padding, is injected via a nozzle into the inside of the trim cover element 2 and cured into an increased mass of the foam padding P which is integral with both fiber assembly 10 and trim cover element 2.

As a result thereof, within the trim cover element 2, it is to be seen that the fiber assembly 10 is positioned on a forward side facing the front surface region of the trim cover element, whereas the foam padding P is positioned on a rearward side facing the rear front surface of the trim cover element. It is also to be seen that, within the trim cover element 2, a bonded layer B is formed in and between the fiber assembly 10 and the foam padding P. In that way, all the fiber assembly, foam padding and trim cover element are formed together in an integral fashion.

More specifically, formation of the bonded layer B is such that, during the foaming process, an outwardly facing side of the rear surface region 10r of the fiber assembly 10 is impregnated with the liquid foaming agent stated above (a liquid urethane foaming agent) and becomes hardened with curing of the liquid foaming agent, which defines that bonded layer B. On the other hand, the liquid foaming agent not in that fiber assembly is cured and expanded into an increased mass of the foam padding P which in turn presses the fiber assembly 10 toward the trim cover element 2, with the result that an entirety of the front surface region 10f of the fiber assembly 10 is closely contacted with substantially a whole of the reverse surface of the front surface region 2a of the trim cover element 2. In this regard, a thickness of the fiber assembly 10 may be set to a desired degree by adjusting an amount of the liquid foaming agent to be injected into the trim cover element. Namely, adjustment of such injecting amount of liquid foaming agent determines a degree of expansion of a resulting foam padding P created from that liquid foaming agent, such that a great expansion of the foam padding may greatly depress the fiber assembly 10 against the trim cover element into a highly compressed state where a thickness of the fiber assembly is very small, or a relatively small expansion of the foam padding may not strongly depress the fiber assembly 10 against the trim cover assembly, so that the fiber assembly is slightly compressed to have a relatively large thickness thereof. This adjustment should be taken into account in assembling the headrest according to a specified technical conditions.

Because of the flattened sewing region 10a of the fiber assembly 10 being sewn to and along the peripheral end region 2aE of the front surface portion 2a of the trim cover element 2, the fiber assembly 10 is positively retained in the trim cover element, and further, even when the liquid foaming agent is injected in the trim cover element 2, the fiber assembly 10 is positively prevented from being dislocated from its predetermined position, so that both fiber assembly 10 and foam padding P are precisely formed together in a required integral fashion.

According to the headrest 1 constructed above, the fiber assembly 10 is positioned on the front side of the headrest, facing the forward side at F of the foam padding P, whereas the foam padding P is positioned on the rear side of the headrest, facing the rear surface region 2b of the trim cover element 2, Therefore, the fiber assembly 10 having a low-repulsive elasticity exists at the front surface portion (at 2a) of the headrest 1 upon which a passenger's head (not shown) is to be contacted, which in effect decreases a repulsion to the passenger's head at that front surface portion of the headrest, thereby giving a soft cushiony touch to the head of the passenger. Also, on the other hand, the high density of the foam padding P provides a high-repulsive elasticity sufficient to absorb a great impact caused in the passenger's head being struck against the headrest.

It is therefore possible to not only offer a soft cushony touch to the passenger's head for a comfortable head support, but also protect the passenger's head against injury and damage including a whiplash injury. Further, in contrast to the conventional headrest having a heavy-weight padding of high density and/or a heavy-weight elastic element of low-repulsive elasticity at the region on which a passenger' head is to be contacted, the headrest of the present invention employs the lightweight fiber assembly 10 which indeed realizes reduction of weight of the headrest. Hence, in the present invention, the headrest itself is light in weight, thus allowing a worker to smoothly mount the headrest to a seat, with small labor.

Moreover, as stated previously, a thickness of the fiber assembly 10 can be set to a desired degree in the forward and rearward directions of the headrest by adjusting an amount of a liquid foaming agent. This adjustment of thickness of the fiber assembly permits the stay 4 to be positioned at a desired location within the foam padding P, which therefore provides an increased freedom for positioning the stay in the foam padding.

In other words, depending on a desired location of the stay 4 within the foam padding, a worker can estimate or preset the above-defined thickness of the fiber assembly 10 relative to a foam padding to be created, and therefore, a freedom for positioning the stay 4 in the foam padding P is increased.

It should be understood that the present invention is not limited to the above-described embodiment. For example, the fiber assembly 10 may preferably be so formed to have a lowest possible density in order to achieve a smallest possible weight of the headrest. Also, for example, the fiber assembly may be formed by a lump of fibers in an indeterminate form state, or a nonwoven cloth made of thermally fused fibers.

Figure 5:
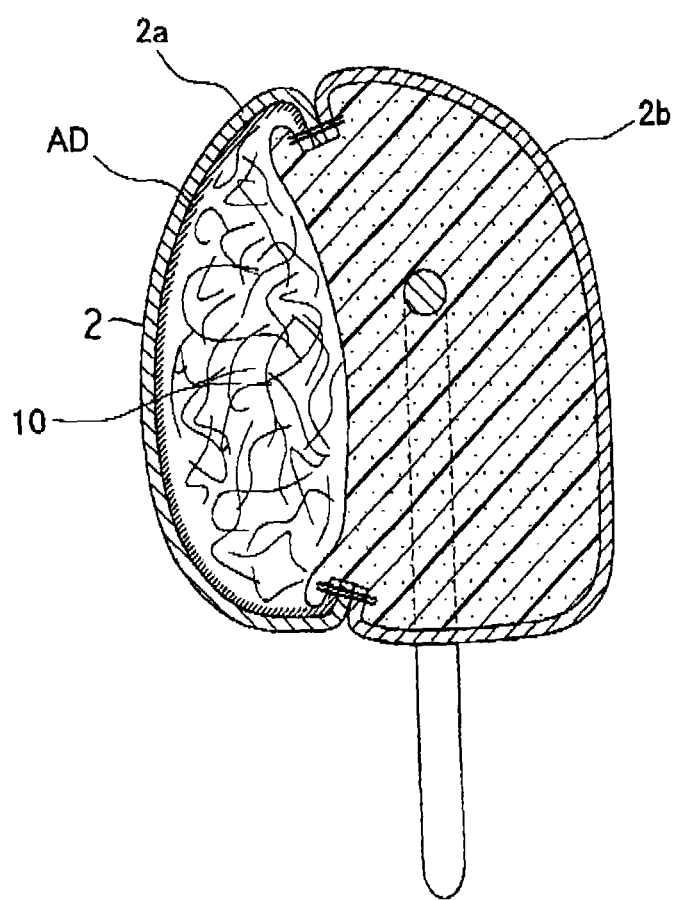
FIG. 5: A sectional view showing another exemplary embodiment of headrest in accordance with the present invention.

The fiber assembly 10 may be directly fixed to the reverse surface region 2a of the trim cover element 2 by any securing element which may be an adhesive agent as shown in FIG. 5 for example. Or, in place of the adhesive agent, a high-frequency fusing may be effected to fuse and bond the fiber assembly to the reverse surface region of the trim cover element.

DESCRIPTION OF THE REFERENCE NUMERALS

1 . . . headrest 2 . . . trim cover element
2a . . . front surface region of the trim cover element
2b . . . rear surface region of the trim cover element
4 . . . stay 10 . . . fiber assembly
10a . . . flattened sewing region of the fiber assembly
S . . . sewing line P . . . foam padding

The invention claimed is:

1. A headrest comprising: a trim cover element formed in a three-dimensional bag configuration; a fiber assembly comprising a lump of non-woven fibers provided within said trim cover element, said fiber assembly being secured to and positioned on a front surface side of the trim cover element; and a foam padding provided within the trim cover element, said foam padding being positioned on a rear surface side of said fiber assembly, surrounding and supported by at least one headrest stay for supporting the headrest on a vehicle seat and being created by a foaming process so that at least a portion of the lump of fibers is impregnated with foam padding material, and an edge of the lump of fibers is sewn to the trim cover element so that the foam padding is integrally attached to said trim cover element and said fiber assembly.

2. The headrest as described in claim 1, wherein said lump of fibers includes a sewing region defined peripherally thereof, and said sewing region is integrally sewn with said trim cover element.

3. The headrest as described in claim 1, wherein said fiber assembly is attached to a reverse surface of said trim cover element.

4. The headrest as described in claim 1, wherein said fiber assembly is comprised of a material having an elastic property.

5. The headrest as described in claim 1, wherein said fiber assembly is disposed at an area of the headrest on which a head of a passenger is to be contacted.

6. The headrest as described in claim 1, wherein said fiber assembly is fixedly secured to a reverse surface of said trim cover element.

* * * * *